Patented Apr. 3, 1928.

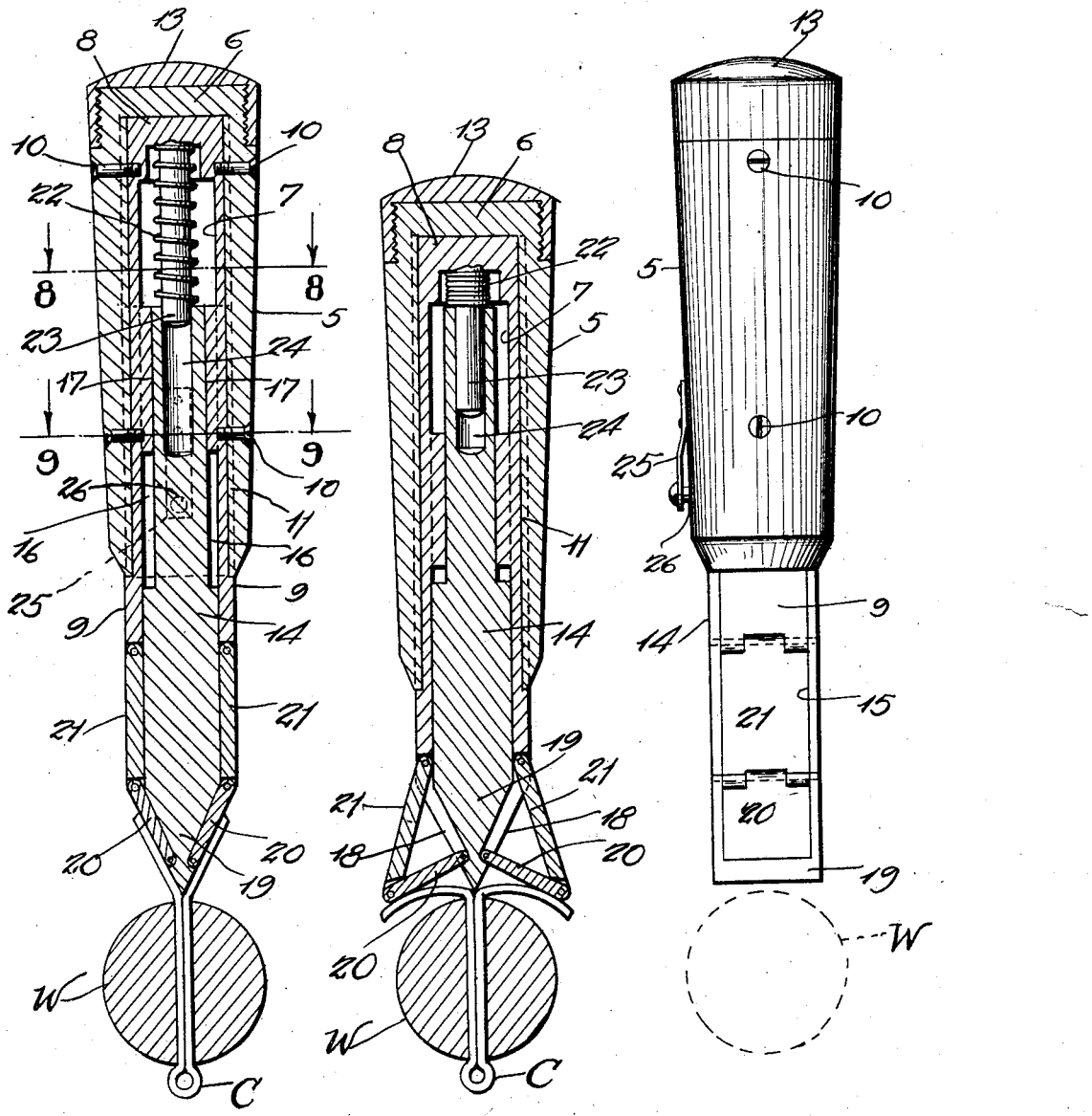

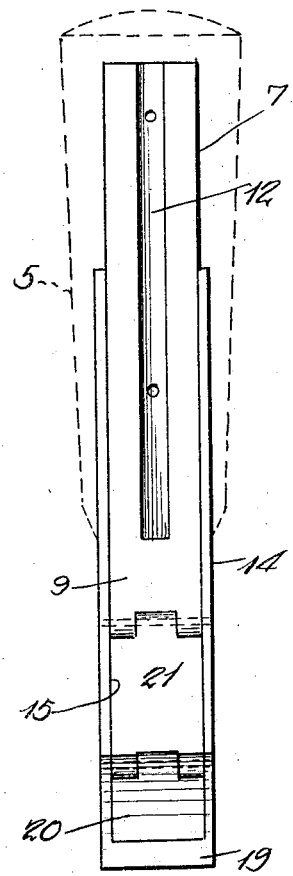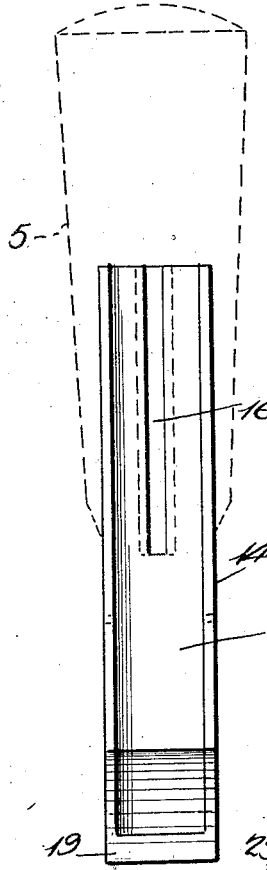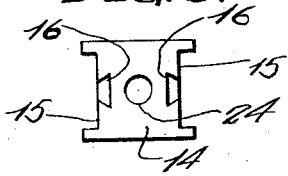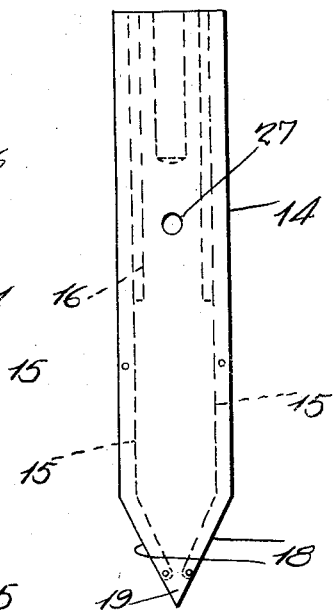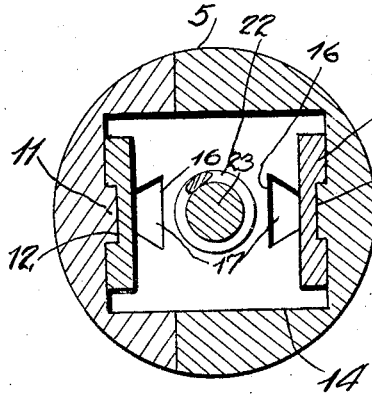

1,664,619

UNITED STATES PATENT OFFICE.

ALBERT GIRARD, OF CANISTEO, NEW YORK.

COTTER-PIN-SPREADING TOOL.

Application filed March 18, 1927. Serial No. 176,494.

This invention relates to an improved tool particularly adapted for use in facilitating spreading of the free end portions of the legs of cotter-pins after the latter have been passed through the work.

The primary object of the present invention is to provide a tool of the above kind which is extremely simple and durable in construction as well as efficient in operation.

A further object is to provide a cotter-pin spreading tool of simple and efficient form including a wedge member adapted to be manually forced between the legs of a cotter-pin to initially spread the same, hinged members normally disposed against the tapering sides of the wedge member to pass with the latter between the cotter-pin legs, and manually operable means for swinging said hinged members outwardly and downwardly relative to the wedge member for completing the spreading operation.

A still further object of the invention is to provide a tool of the above kind wherein the wedge member constitutes the tapered end of a plunger slidably carried by an operating hand and adapted to be projected relative to said handle to effect the normal positioning of said hinged members against the sides of the wedge members, the handle being further equipped with means for holding the plunger in projected position and releasable to permit the plunger to telescope into the handle whereby the hinged members are swung outwardly and downwardly for completing the spreading operation upon application of pressure to the handle while the holding means is released.

A still further object is to provide means for normally yieldingly projecting the plunger relative to the handle so that the only manual operation necessary in the use of the tool is the application of pressure to the tool and release of the holding means.

A still further object is to provide simple operative connections between the handle and the hinged members for automatically causing the latter to be normally disposed against the tapered sides of the wedge member when the plunger is projected and to cause forcible outward and downward swinging of said hinged members upon release of the plunger relative to the handle and application of pressure to the handle toward the cotter pin.

Other objects will become apparent as the nature of the invention is better understood, and the same consists in the novel form, combination and arrangement of parts hereinafter more fully described, shown in the accompanying drawing and claimed.

In the drawings, wherein like reference characters indicate corresponding parts throughout the several views, Fig. 1 is a central longitudinal sectional view of a cotter pin spreading tool constructed in accordance with the present invention and in its normal condition with the plunger held in projected position and with its wedge member or tapered end entered between the legs of a cotter pin to initially spread the same;

Fig. 2 is a view somewhat similar to Fig. 1 illustrating the tool with the plunger telescoped into the handle as effected by applying pressure to the handle in a direction toward the cotter pin after release of the plunger, and showing the hinged members swung outwardly and downwardly with the cotter pin in finally spread condition;

Fig. 3 is a side elevational view of the tool as shown in Fig. 1;

Fig. 4 is a similar view thereof with the handle and the plunger guiding pin and projecting spring removed;

Fig. 5 is a view similar to Fig. 4 with the hinged members detached and their operating connections removed so that this view is substantially a side elevational view of the plunger looking at a tapered side of its wedge member or point;

Fig. 6 is a top plan view of the plunger shown in Fig. 5;

Fig. 7 is an elevational view looking toward the left of Fig. 5;

Figure 8 is a transverse section taken substantially upon line 8—8 of Fig. 1; and Fig. 9 is a section taken upon line 9—9 of Fig. 1.

Referring more in detail to the drawings, the form of the invention illustrated embodies an elongated hollow handle 5 closed at one end as at 6 and open at its other end, the bore of the handle being of general rectangular form in cross-section as seen in Figs. 8 and 9. Snugly fitted in the handle 5 is a U-shaped frame 7, the intermediate connecting portion 8 of which is disposed in contact with the inner face of the end wall 6 of the handle 5, and the leg portions of which extend longitudinally of the handle in contact with opposite sides of the bore thereof. The legs of the frame 7 are in spaced parallel relation and project through and beyond the open outer end of the handle 5 as indicated at 9, while suitable means is provided for fastening the frame in place within the handle, such as screws 10 passing transversely through the handle at a plurality of points and threaded into suitable sockets provided in the outer sides of the legs of the frame 7 as clearly shown in Figs. 1, 3, and 9. In order to provide a rigid durable construction and to facilitate assembly of the parts, the handle 5 is provided with opposed longitudinal internal ribs 11, and the legs of the frame 7 are formed in the outer side thereof with longitudinal grooves 12 adapted to snugly slidably engage the ribs 11 when the frame 7 is slid into the handle through the open end of the latter. If desired, the closed end of the handle 5 may be slightly reduced in diameter and externally threaded so as to receive a detachable protecting cap 13 having a rounded external end surface so that pressure may be applied to the end of the handle in operating the tool, without causing discomfort to the user.

An elongated plunger 14 of general rectangular form in cross section is slidably disposed between the legs of the frame 7 for movement longitudinally of the handle 5, and the opposite sides of this plunger 14 are recessed as at 15 substantially from end to end to snugly slidably receive the legs of the frame 7 as indicated in several of the views. The recessed sides of the plunger 14 are formed with central longitudinal undercut grooves 16 which extend from the intermediate portion of the plunger to the upper end thereof, and rigid with the inner sides of the legs of the frame 7 are ribs 17 adapted to slidably engage in the grooves 16 for effectively guiding the plunger 14 in its sliding movement relative to the handle and frame, and to furnish a construction which is generally rigid and durable as well as braced to avoid relative lateral play of the parts.

The recessed sides of the plunger 14 are tapered as at 18, to a point, thus forming a wedge member 19 of the outer end of the plunger, as shown. Disposed in the recessed portions of the tapered sides 18 of wedge member 19 are members 20 which are hinged at their outer or lower ends to the wedge member 19 upon transverse parallel axes so that they may be swung outwardly and downwardly or forwardly as shown in Figure 2 from their normal positions within the recessed portions as illustrated in Fig. 1. The inner or upper ends of the hinged members 20 are operatively connected to the adjacent free ends of the legs of frame 7 as by means of links 21, the inner ends of which are hinged to the free ends of the legs of frame 7, and the outer ends of which are hinged to the adjacent free ends of the hinged members 20. It will thus be seen that each pair of connected members 20 and 21 forms substantially a toggle joint normally partly broken so that upon forcing the frame 7 longitudinally of the plunger 14 toward the point or wedge member 19 of the latter, the members 20 will be swung outwardly and downwardly from the position of Fig. 1 to the position of Fig. 2. It will also be seen that upon relative sliding movement of the members 5 and 7 on the one hand and the member 14 on the other hand, in a direction away from each other, the members 20 will be swung upwardly into engagement with the tapered sides of the wedge member 19 and within the recess portion of the latter, while the link 20 will be retracted into engagement with the parallel sides of plunger 14 within the adjacent portions of the recesses 15 of the latter.

The plunger 14 is normally yieldingly projected and for this purpose, a spring preferably of helical form and of the compression type as indicated at 22 is interposed between the inner end of the portion 14 and the intermediate connecting portion 8 of the frame 7. In order to effectively guide the plunger in its movements and retain the spring 22 operatively disposed axially of the handle, a guide pin 23 is rigidly carried by the connecting portion 8 of frame 7 and projects forwardly axially of the handle 5 so as to be disposed to slidably move into and out of an axial socket 24 provided in the inner end portion of the plunger 14.

Suitable means is preferably provided for releasably holding the plunger 14 in its normal projected relation to the handle 5 as shown in Fig. 1. This means preferably consists of a resilient strip of metal 25 fastened to the outside of the handle 5 and having a free end carrying a latch pin 26 which slidably projects through the handle 5 and is normally caused by the resilient strip 25 to enter a side socket 27 provided in the plunger 14 so as to register with the pin 26 when the plunger is projected.

In operation, the parts are normally disposed as shown in Fig. 1 with the plunger 14 held projected by the pin 26. With the parts in this position the wedge member 19 is inserted between the free end portions of the cotter pin legs, whereupon pressure is applied upon the handle 6 while held in the hands so as to force the latter longitudinally toward the work W through which the cotter-pin C extends. In this way the wedge member 19 is caused to completely enter between the projecting end portions of the cotter pin legs so as to initially spread the same as shown in Fig. 1. The pin 26 is then released by springing the resilient strip 25 outwardly or away from the handle 5, and while this pin is held released a further pressure in the same direction is exerted upon the handle so as to cause it to move together with the frame 7 longitudinally on the plunger 14 thereby causing a telescoping action of the plunger relative to the handle. This forces forwardly or downwardly upon the link 21 and the latter, by reason of their connection with the hinged spreading member 20, cause the latter to swing outwardly and forwardly or downwardly, thereby pressing the ends of the cotter pin legs further apart and effecting a final spreading action thereof as illustrated in Fig. 2. As soon as the pressure is relieved from the handle the spring 22 will immediately return the handle to normal position wherein the plunger is projected relative to the handle, and the pin 26 automatically snaps into the socket 27 to hold the parts in this position, at the same time retaining the members 20 and link 21 in the portions of the recesses 15 at the tapered sides of the wedge member 19 and the parallel sides of the plunger 14, to which positions said members 20 and 21 are automatically brought by reason of their connection with the legs of the frame 7 that moves with the handle 5 relative to the plunger 14.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A cotter-pin spreading tool including a wedge member, spreading members hinged at the tapered sides of the wedge member to swing outwardly and forwardly relative to the latter, and means for swinging said spreading members.

2. A cotter-pin spreading tool including a wedge member, spreading members hinged at the tapered sides of the wedge member to swing outwardly and forwardly relative to the latter, and means for swinging said spreading members, said tapered sides of the wedge member being recessed to normally receive the spreading members when the latter are in inoperative rearwardly and inwardly swung position.

3. A cotter-pin spreading tool including a wedge member, spreading members hinged at the tapered sides of the wedge member to swing outwardly and forwardly relative to the latter, means for swinging said spreading members, and a plunger having a tapered end forming said wedge member, said last named means embodying a handle member slidable on the plunger and operatively connected to the spreading members.

4. A cotter-pin spreading tool including a wedge member, spreading members hinged at the tapered sides of the wedge member to swing outwardly and forwardly relative to the latter, means for swinging said spreading members, a plunger having a tapered end forming said wedge member, said last named means embodying a handle member slidable on the plunger and operatively connected to the spreading members, and yieldable means normally projecting said plunger relative to the handle.

5. A cotter-pin spreading tool including a wedge member, spreading members hinged at the tapered sides of the wedge member to swing outwardly and forwardly relative to the latter, means for swinging said spreading members, a plunger having a tapered end forming said wedge member, said last named means embodying a handle member slidable on the plunger and operatively connected to the spreading members, yieldable means normally projecting said plunger relative to the handle, and means to releasably hold the plunger projected.

6. A cotter-pin spreading tool including a wedge member, spreading members hinged at the tapered sides of the wedge member to swing outwardly and forwardly relative to the latter, means for swinging said spreading members, a plunger having a tapered end forming said wedge member, said last named means embodying a handle member slidable on the plunger and operatively connected to the spreading members, yieldable means normally projecting said plunger relative to the handle, and means to releasably hold the plunger projected, said holding means embodying a catch carried by the handle and engaged with the plunger.

7. A cotter-pin spreading tool including a hollow handle, a plunger slidable therein, a spring normally projecting the plunger relative to the handle, a wedge member rigid with the outer end of the plunger, means to releasably hold the plunger projected, expansible spreading means embodying laterally movable members at the tapered sides of the wedge member, and means operatively connecting the laterally movable members with the handle to cause expansion of said members when the handle and plunger are moved relatively toward each other.

8. A cotter-pin spreading tool including a hollow handle, a plunger slidable therein, a spring normally projecting the plunger relative to the handle, a wedge member rigid with the outer end of the plunger, means to releasably hold the plunger projected, expansible spreading means embodying laterally movable members at the tapered sides of the wedge member, means operatively connecting the laterally movable members with the handle to cause expansion of said members when the handle and plunger are moved relatively toward each other, said laterally movable members being hinged to the wedge member, and said connecting means embodying links pivotally connected to the said members and the handle disposed at the sides of the plunger.

9. A cotter-pin spreading tool including a hollow handle, a plunger slidable therein, a spring normally projecting the plunger relative to the handle, a wedge member rigid with the outer end of the plunger, means to releasably hold the plunger projected, expansible spreading means embodying laterally movable members at the tapered sides of the wedge member, means operatively connecting the laterally movable members with the handle to cause expansion of said members when the handle and plunger are moved relatively toward each other.

10. A cotter-pin spreading tool including a hollow handle, a frame in the handle, a plunger slidable therein, a spring normally projecting the plunger relative to the handle, a wedge member rigid with the outer end of the plunger, means to releasably hold the plunger projected, expansible spreading means embodying laterally movable members at the tapered sides of the wedge member, means operatively connecting the laterally movable members with the handle to cause expansion of said members when the handle and plunger are moved relatively toward each other, said connecting means embodying links attached to the ends of said frame.

11. A cotter-pin spreading tool including a hollow handle, a frame in the handle, guide ribs extending longitudinally of the frame, a plunger slidable therein, a spring normally projecting the plunger relative to the handle, a wedge member rigid with the outer end of the plunger, means to releasably hold the plunger projected, expansible spreading means embodying laterally movable members at the tapered sides of the wedge member, means operatively connecting the laterally movable members with the handle to cause expansion of said members when the handle and plunger are moved relatively toward each other, said connecting means embodying links attached to the ends of said frame, the sides of the plunger having recesses to receive the ribs of the frame and to normally receive the links.

12. A cotter-pin spreading tool including a hollow handle, a frame in the handle, guide ribs extending longitudinally of the frame, a plunger slidable therein, a spring normally projecting the plunger relative to the handle, a wedge member rigid with the outer end of the plunger, means to releasably hold the plunger projected, expansible spreading means embodying laterally movable members at the tapered sides of the wedge member, means operatively connecting the laterally movable members with the handle to cause expansion of said members when the handle and plunger are moved relatively toward each other, said connecting means embodying links attached to the ends of said frame, the sides of the plunger having recesses to receive the ribs of the frame and to normally receive the links, said members being hinged, and the wedge member being recessed to normally receive said members.

In testimony whereof I affix my signature.

ALBERT GIRARD.